(12) United States Patent
Borntrager et al.

(10) Patent No.: US 7,597,522 B2
(45) Date of Patent: Oct. 6, 2009

(54) POWERED HAND TRUCK

(76) Inventors: Steven Borntrager, 564 Ferrell Rd., Stonefort, IL (US) 62987; James Borntrager, 426 N. Battleford Rd., Carrier Mills, IL (US) 62917

( * ) Notice: Subject to any disclaimer, the term of this patent is extended or adjusted under 35 U.S.C. 154(b) by 21 days.

(21) Appl. No.: 11/822,844

(22) Filed: Jul. 10, 2007

(65) Prior Publication Data
US 2008/0044265 A1 Feb. 21, 2008

Related U.S. Application Data

(60) Provisional application No. 60/838,138, filed on Aug. 17, 2006.

(51) Int. Cl.
*B62D 51/05* (2006.01)
(52) U.S. Cl. .................. 414/347; 180/19.1
(58) Field of Classification Search ............. 414/347, 414/467, 785, 921, 462; 280/402, 460; 180/65.3, 180/19.1
See application file for complete search history.

(56) References Cited

U.S. PATENT DOCUMENTS

| | | | |
|---|---|---|---|
| 2,851,179 A | | 9/1958 | Vance |
| 3,485,314 A | | 12/1969 | Herr |
| 3,489,249 A | | 1/1970 | Stammen |
| 3,799,379 A | * | 3/1974 | Grether et al. ............. 414/467 |
| 3,805,979 A | | 4/1974 | Stoltz |
| 4,049,083 A | * | 9/1977 | Garvey ...................... 187/232 |
| 4,266,795 A | * | 5/1981 | Walker ...................... 280/402 |
| 4,396,341 A | * | 8/1983 | Brouwer et al. ............ 414/467 |
| 4,571,139 A | * | 2/1986 | Moseley et al. ............ 414/347 |
| 4,629,391 A | | 12/1986 | Soyk et al. |
| 4,708,577 A | * | 11/1987 | Fratzke ..................... 414/635 |
| 4,728,245 A | * | 3/1988 | Shelton ..................... 414/490 |
| 4,921,075 A | * | 5/1990 | Schumacher et al. ....... 187/229 |
| 5,117,944 A | * | 6/1992 | Hurtevent .................. 187/223 |

(Continued)

FOREIGN PATENT DOCUMENTS

GB 2257684 1/1993

(Continued)

OTHER PUBLICATIONS

Website, http://www.liftproducts.com/Mobilelifts/Max_Stacker.html, series of models of manual and powered walk-behind lifts, five sheets printed from the internet on May 13, 2006.

*Primary Examiner*—Charles A Fox
(74) *Attorney, Agent, or Firm*—Richard C. Litman

(57) ABSTRACT

The powered hand truck has a chassis supported at one end by a single axle with two independently operable drive wheels. A prime mover is provided generally medially on the chassis, driving the drive wheels and powering the forklift mechanism. An operator console extends from the end of the chassis opposite the wheels, with an operator platform extending beyond the base of the operator console. The forklift mechanism has a pantograph arrangement supported by a pivotally mounted column. The forklift mast remains parallel to the column at all times and includes a manually actuated upper extension. A storage rack and dolly may be installed upon a suitable transport vehicle for transporting the powered hand truck. The hand truck forks engage the storage rack dolly, with the dolly translating along the rack to allow the truck to be deployed from, or loaded onto, the transport vehicle.

8 Claims, 15 Drawing Sheets

U.S. PATENT DOCUMENTS

| | | |
|---|---|---|
| D420,481 S | 2/2000 | Yates |
| 6,062,800 A * | 5/2000 | Perry et al. ................. 414/467 |
| D468,884 S | 1/2003 | Ito |
| 6,536,709 B1 | 3/2003 | McVaugh |
| 6,572,322 B2 * | 6/2003 | Karr ........................... 414/462 |
| 2001/0026756 A1 * | 10/2001 | Mortimore ................. 414/556 |
| 2001/0038786 A1 | 11/2001 | Kim |
| 2003/0029647 A1 | 2/2003 | Trego et al. |
| 2004/0076501 A1 | 4/2004 | McGill et al. |
| 2004/0265113 A1 * | 12/2004 | Quinlan et al. .............. 414/785 |

FOREIGN PATENT DOCUMENTS

| | | |
|---|---|---|
| JP | 2-133232 | 5/1990 |

* cited by examiner

POWERED HAND TRUCK

CROSS-REFERENCE TO RELATED APPLICATION

This application claims the benefit of U.S. Provisional Patent Application Ser. No. 60/838,138, filed Aug. 17, 2006.

BACKGROUND OF THE INVENTION

1. Filed of the Invention

The present invention relates generally to small, portable, powered lifting and transport devices. More particularly, the present invention comprises a powered hand truck having a self-contained prime mover on board, which powers a hydraulic system for driving the wheels and lifting mechanism of the device.

2. Description of the Related Art

A number of powered devices comprising a wide array of different configurations have been developed in the past for the powered lifting and carriage of large, bulky articles. The conventional forklift in its various configurations is a well-known example of such. However, such forklift type vehicles are not suitable for use in the operating environment of the present invention due to their relatively bulky configuration, wheel configuration, etc.

Various other specialized powered machines for lifting various heavy and/or bulky articles have also been developed in the past. An example of such is found in Japanese Patent No. 2-133,232, published on May 22, 1990. The '232 patent describes (according to the drawings and English abstract) various improvements in a relatively small, lightweight powered forklift type device, with the improvements primarily directed to a specially configured frame and balance weights to reduce vibration. The forklift device itself has four wheels, with two closely spaced directional guidance wheels controlled by a vertical column connected thereto and controlled by an operator who may ride upon a small platform extending from the device. The controls are deployed from a fixed location on the machine and cannot articulate to suit the location or position of the operator.

Thus, a powered hand truck solving the aforementioned problems is desired.

SUMMARY OF THE INVENTION

The powered hand truck is configured particularly for lifting and transporting heavy and/or large and bulky objects, e.g., skid-mounted portable buildings and sheds, dumpsters and cargo containers, etc., over relatively short distances. The device is particularly valuable in industrial environments, such as portable shed and outbuilding construction companies, tree and plant nurseries where such buildings are used for various operations, farm operations, etc. A vehicle-mounted storage rack may also be provided for transport of the device to various sites where it is needed, e.g., residential construction and industrial sites where movement of a storage shed, dumpster, or similar large, heavy, and bulky object is required and where movement of the object using a larger and heavier conventional utility vehicle, e.g., truck, tractor or tracked vehicle, etc., is impracticable due to space limitations for access and maneuvering, potential damage to landscape, etc.

The powered hand truck has a base platform or chassis supported by only a single axle having two opposed wheels. Each wheel includes a drive motor (e.g., hydraulic motor) at its hub, with differential power to the two wheels being used to turn and steer the machine. The power plant for operation of the drive motors is disposed on the chassis behind the axle, with an operator platform and control pedestal or console extending further rearwardly beyond the motor. An alternate embodiment may include castering wheels at the operator platform end of the machine for supporting that end of the machine when an operator is standing upon the platform and no load is applied to the lift mechanism to counterbalance the weight of the operator.

A support column for the lift mechanism is pivotally mounted above the center of the axle and allows the lift mechanism to pivot left or right relative to the longitudinal axis of the chassis for greater maneuverability and versatility. The lift mechanism comprises upper and lower pairs of parallel arms extending from the support column, with the distal ends of the arms attaching to a fork lift mast, which remains parallel to the lift mechanism support column at all times. This arrangement results in the forks being carried close to the two support wheels and tires when the forks are close to the surface, with the forks and arms swinging upwardly and outwardly away from the chassis as the arms rise to a horizontal orientation. The forks move back closer to the vehicle as the arms continue to rise, thereby moving the center of gravity of the load closer to the vehicle when the load is lifted to a relatively great height. The forks are raised by a hydraulic cylinder, which extends between the lower set of arms and the upper end of the forklift mast. A forklift mast extension winch is provided at the top of the mast to raise the upper portion of the mast and its lateral brace as required during certain operations.

The forklift actuation cylinder, as well as the throttle or speed control for the motor and individual controls for the two drive motors located at the wheels, are disposed at the distal end of a console or pedestal, which may articulate from the chassis opposite the axle end thereof in the embodiment of the machine that includes only the two main drive wheels. The operator platform is cantilevered from the chassis beyond the base of the console.

A storage rack for the powered hand truck may be provided on the bed of a light truck or other suitable transport vehicle, as desired. The storage rack comprises a laterally disposed track mechanism with a hand truck storage dolly secured to the track mechanism. The dolly is drawn back and forth along the tracks by a motorized chain drive. The forks of the powered hand truck engage the dolly, with the fork lift mechanism of the hand truck raising and lowering the hand truck relative to the forks and dolly in order to deploy the hand truck from the storage rack and transport vehicle upon which it is mounted, and to return the hand truck to the storage rack and transport vehicle.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

The present invention comprises a powered hand truck for the movement of relatively large and heavy objects (e.g., skid mounted portable buildings, dumpsters, etc.) over relatively short distances. A portable storage rack for mounting upon a transport vehicle (e.g., flat bed pickup truck, etc.) is also provided for the transport of the powered hand truck, as required.

Figure 1:
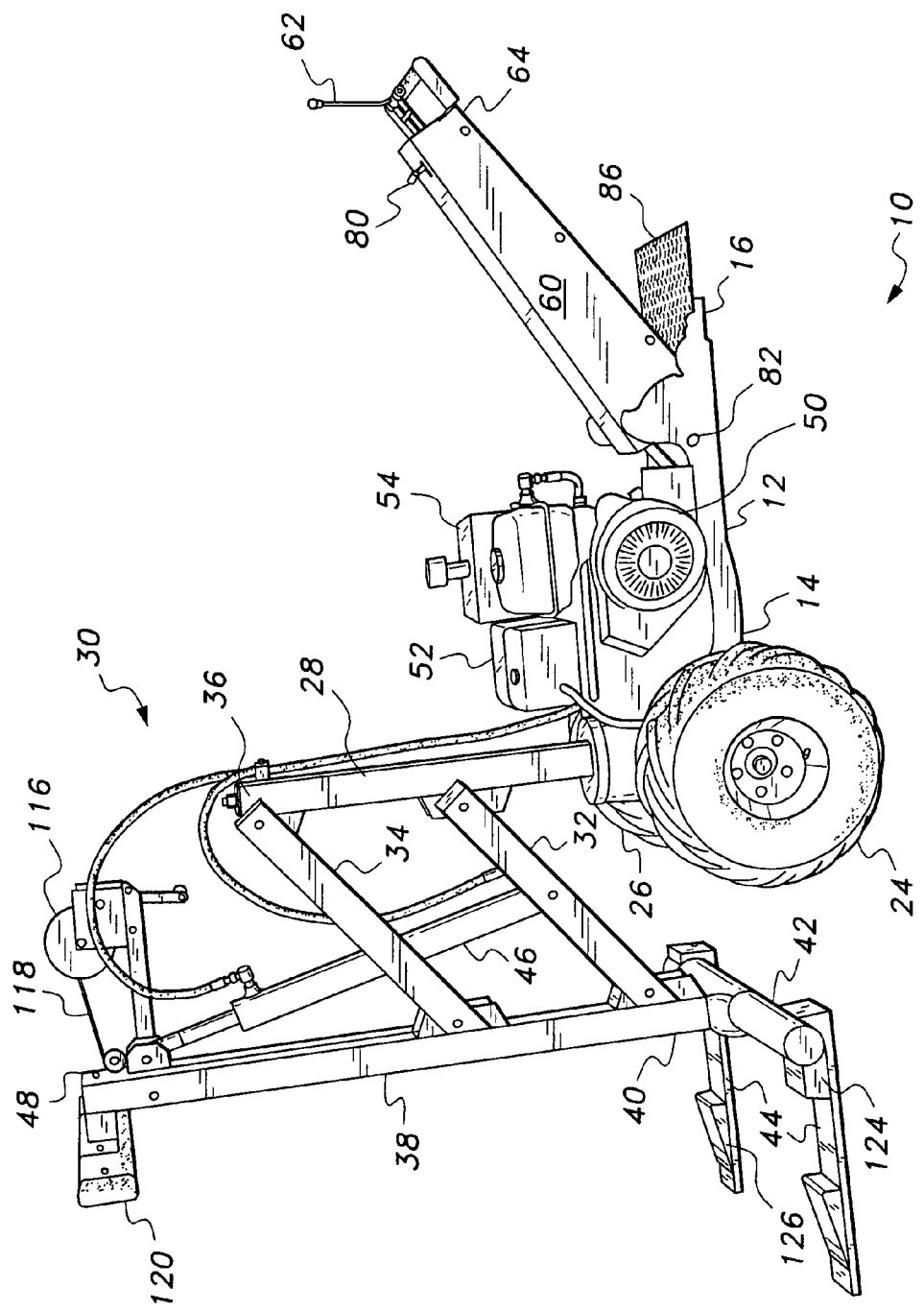
FIG. 1 is a perspective view of a first embodiment of a powered hand truck according to the present invention, showing its general configuration and features.

FIG. 1 of the drawings provides a left side perspective view of the powered hand truck 10, illustrating its general features. The hand truck 10 includes a chassis 12 having a support axle end 14 and an opposite operator end 16. A single axle 18 (shown most clearly in FIG. 4) extends laterally across the support axle end 14 of the chassis 12, with the remainder of the chassis (including the operator end 16) being cantilevered from the single support axle 18. The axle 18 has opposite first and second ends, respectively 20 and 22, with first and second drive wheels, respectively 24 and 26, installed upon the first and second axle ends 20 and 22. The axle 18 is pivotally attached to the axle end 14 of the chassis 12 about a longitudinal pivot axis to adjust for uneven terrain between the wheels and any load being carried. The suspension system for the single axle 18 is discussed in detail further below.

A forklift support column 28 extends upwardly from the axle end 14 of the chassis 12, with a forklift mechanism 30 extending from the forklift support column. The forklift mechanism 30 comprises a pantograph configuration, i.e., a series of pivotally attached parallel arms. A lower pair of forklift actuating arms 32 is pivotally attached to the medial portion of the support column 28, and an upper pair of actuating arms 34 is pivotally attached to the upper end 36 of the of the support column 28. The distal ends of the arm pairs or sets are pivotally attached to a forklift mast 38, with the lower arms 32 attaching at the lower end 40 of the mast 38 and the upper arms 34 attaching to the medial portion of the forklift mast 38. A fork attachment arm or bar 42 extends laterally across the lower end 40 of the mast 38, with a pair of fork tines 44 extending forwardly from opposite ends of the fork attachment arm 42.

Figure 2:
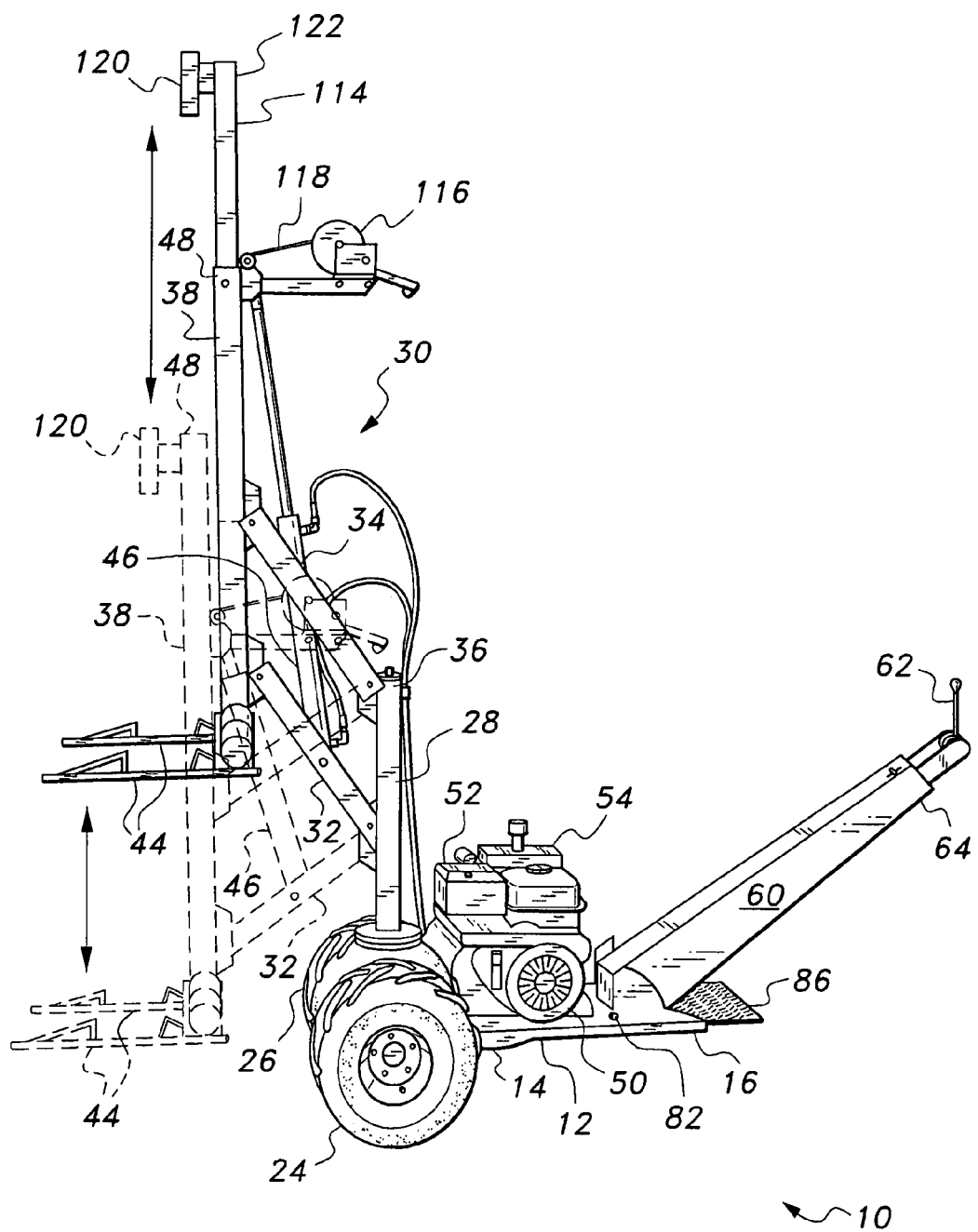
FIG. 2 is a perspective view of the powered hand truck of FIG. 1, showing the operation of the hydraulic lifting mechanism of the device.

The forklift mechanism is operated by a double acting hydraulic cylinder 46, which is pivotally secured at its lower end between the medial portions of the two lower forklift actuating arms 32, and at its upper end to the upper end 48 of the forklift mast 38. FIGS. 1 and 2 illustrate the operation of the hydraulic cylinder 46 and the resulting actuation of the forklift mechanism 30. In FIG. 1, the hydraulic cylinder 46 is shown in its retracted (shortest) configuration, with the distance between the medial portion of the lower forklift actuating arms 32 and the upper end 48 of the forklift mast 38 at its shortest span. This draws the distal ends of the lower and upper actuating arms 32 and 34 to their lowest positions, thereby placing the fork tines 44 at their lowest position. This configuration is also shown in broken lines in FIG. 2.

When hydraulic pressure is applied to the cylinder 46 to extend the cylinder, the upper end 48 of the forklift mast 38 is driven away from the medial portion of the lower actuating arms 32, thereby causing the arms 32 and 34 to move their distal ends upwardly with the mast 38, the fork tines 44 raising correspondingly. This is shown in solid lines in FIG. 2 of the drawings.

Figure 7:
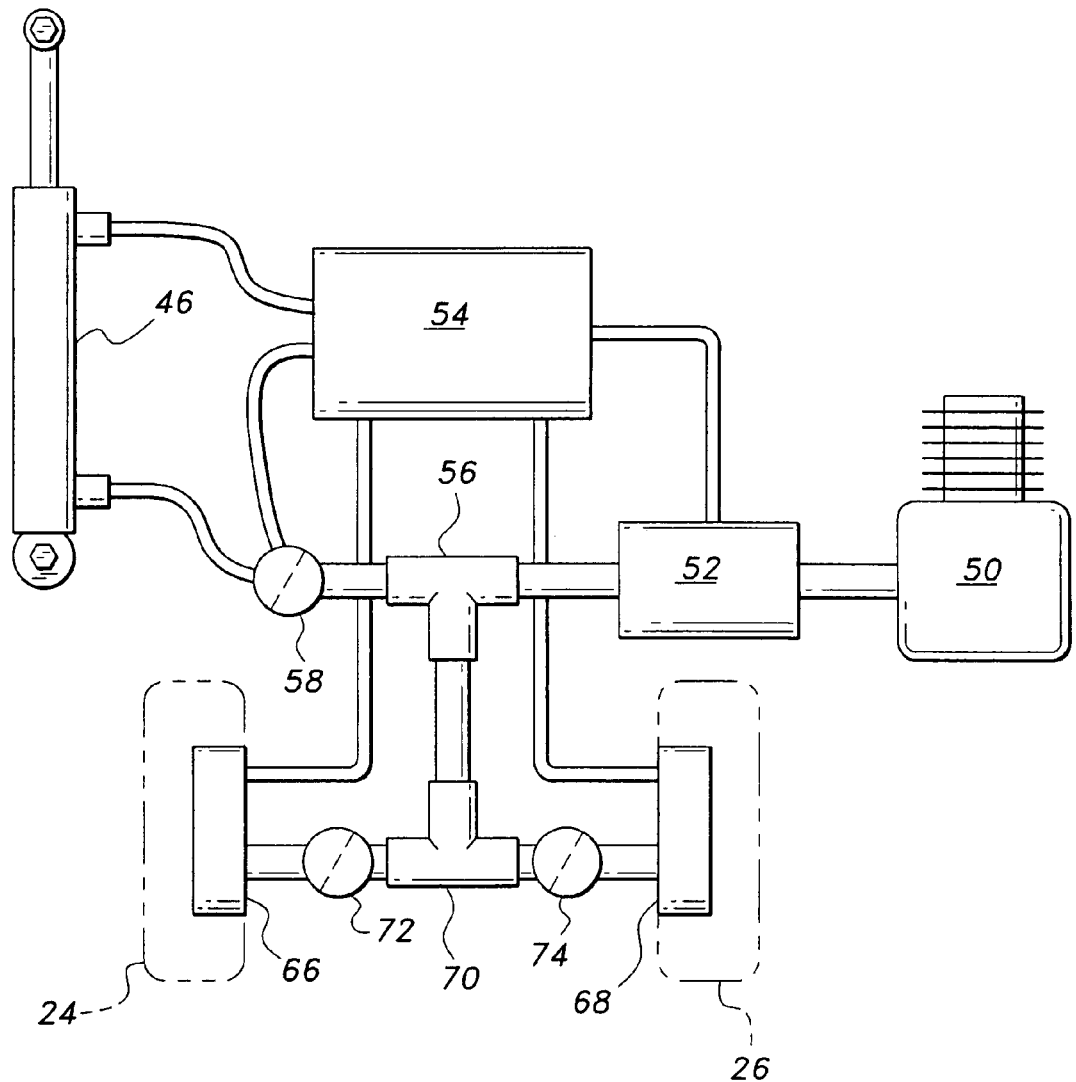
FIG. 7 is a pictorial schematic view of an exemplary hydraulic system for use with a powered hand truck according to the present invention.

FIG. 7 of the drawings provides a pictorial schematic drawing of an exemplary hydraulic system for powering the powered hand truck 10, with some of the components also being shown in other drawings. The hydraulic system is powered by a prime mover 50, e.g., an internal combustion engine, etc., installed generally medially upon the chassis 12. Alternatively, an electric motor may be used, drawing power from electrical storage batteries carried aboard the hand truck 10, or alternatively by grid power delivered by an electrical cord or line. The prime mover 50 in turn drives a hydraulic pump 52, which receives hydraulic fluid from a reservoir or tank 54. The pump 52 provides hydraulic fluid under pressure to the hydraulic lift cylinder 46 to actuate the forklift mechanism 30 and to drive the wheels 24 and 26 through a tee fitting 56 and control valve 58. An operator console 60 extends from the operator end 16 of the chassis 12, and includes a forklift cylinder control lever 62 extending from the distal end 64 of the console for control of the forklift cylinder control valve 58. Conventional pressure regulator and/or restrictor valves, etc. (not shown) may be provided in the hydraulic system, as required.

The first tee 56 also distributes hydraulic pressure to the left and right drive wheel hydraulic motors, respectively 66 and 68, contained within the respective left and right wheels 24 and 26, via a second tee fitting 70. Left and right drive wheel motor control valves, respectively 72 and 74, are controlled respectively by left and right twist grips 76 and 78, shown in FIG. 8, (or other control configuration, as desired) on the handlebar grip at the distal end 64 of the operator console 60. An engine throttle 80 may also be provided on the console 60, with the drive wheel hydraulic controls 76 and 78 and the throttle 80 being shown most clearly in FIGS. 8 and 9 of the drawings.

Figure 3:
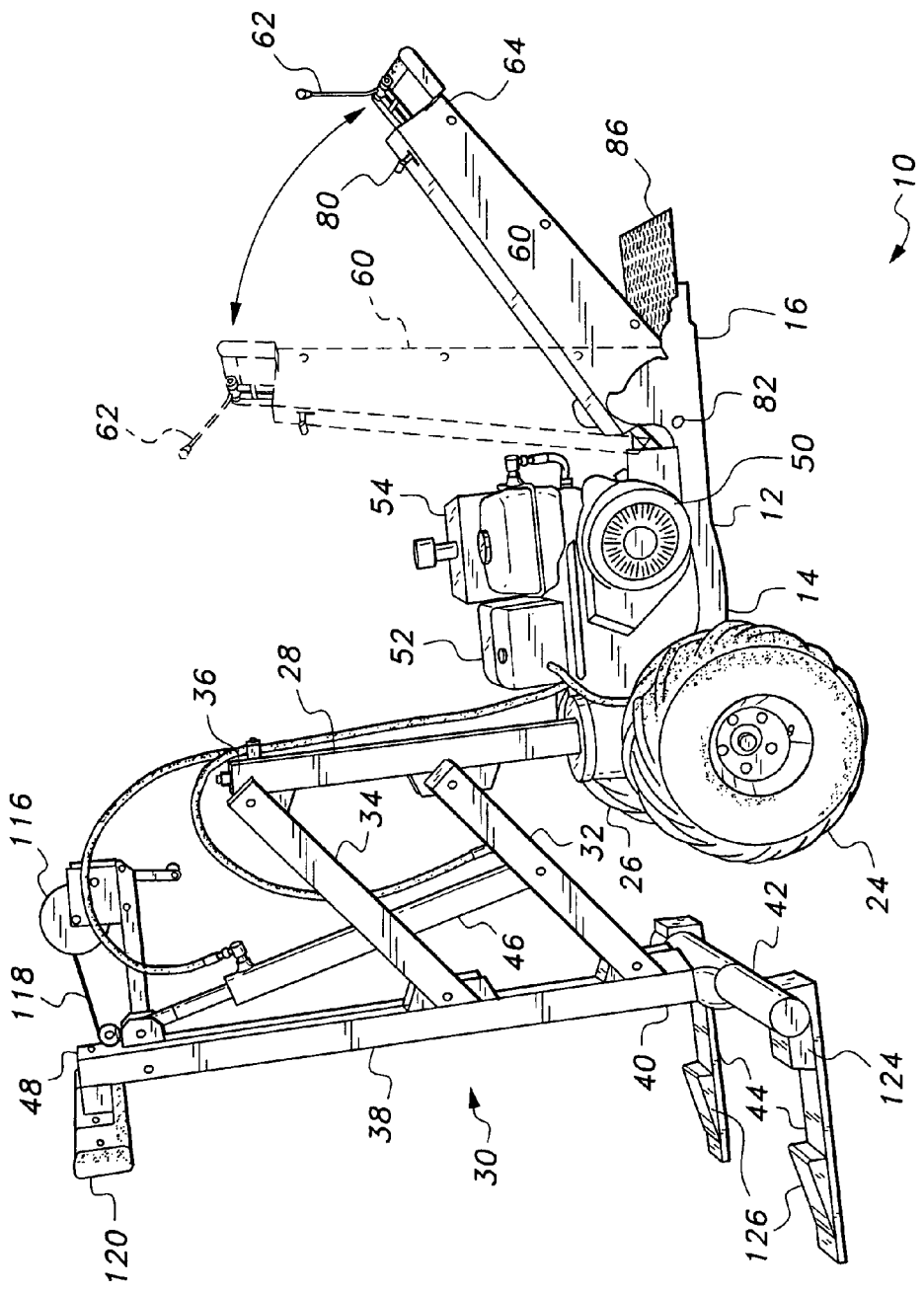
FIG. 3 is a perspective view of the powered hand truck of FIGS. 1 and 2, showing the articulation of the control console.

In the embodiment of FIGS. 1 through 3, 8, and 9, the console 60 is pivotally attached to the operator end 16 of the chassis 12 by a lateral console attachment pin or bolt 82, which allows the console 60 to articulate about the axis defined by the lateral bolt 82. A latch lever 84, shown most clearly in FIGS. 8 and 9 of the drawings, may be used to engage a dog-toothed sector gear within the base of the console 60 to lock the angular position of the console. FIG. 3 of the drawings illustrates the operator console 60 in its horizontally extended position in solid lines, and in its alternative substantially vertical orientation in broken lines. The console 60 may be adjusted at various intermediate angular positions as well. The articulation of the console 60 allows the height of the operator controls at the distal end 64 of the console to be positioned as desired by the operator, depending upon the location of the operator. An operator platform 86 is cantilevered from the extreme operator end 16 of the chassis 12, allowing the operator to stand upon the platform 86 to operate the powered hand truck 10 therefrom when the console 60 is raised. The operator may stand upon the ground or surface while operating the device when the console 60 is lowered.

Figure 4:
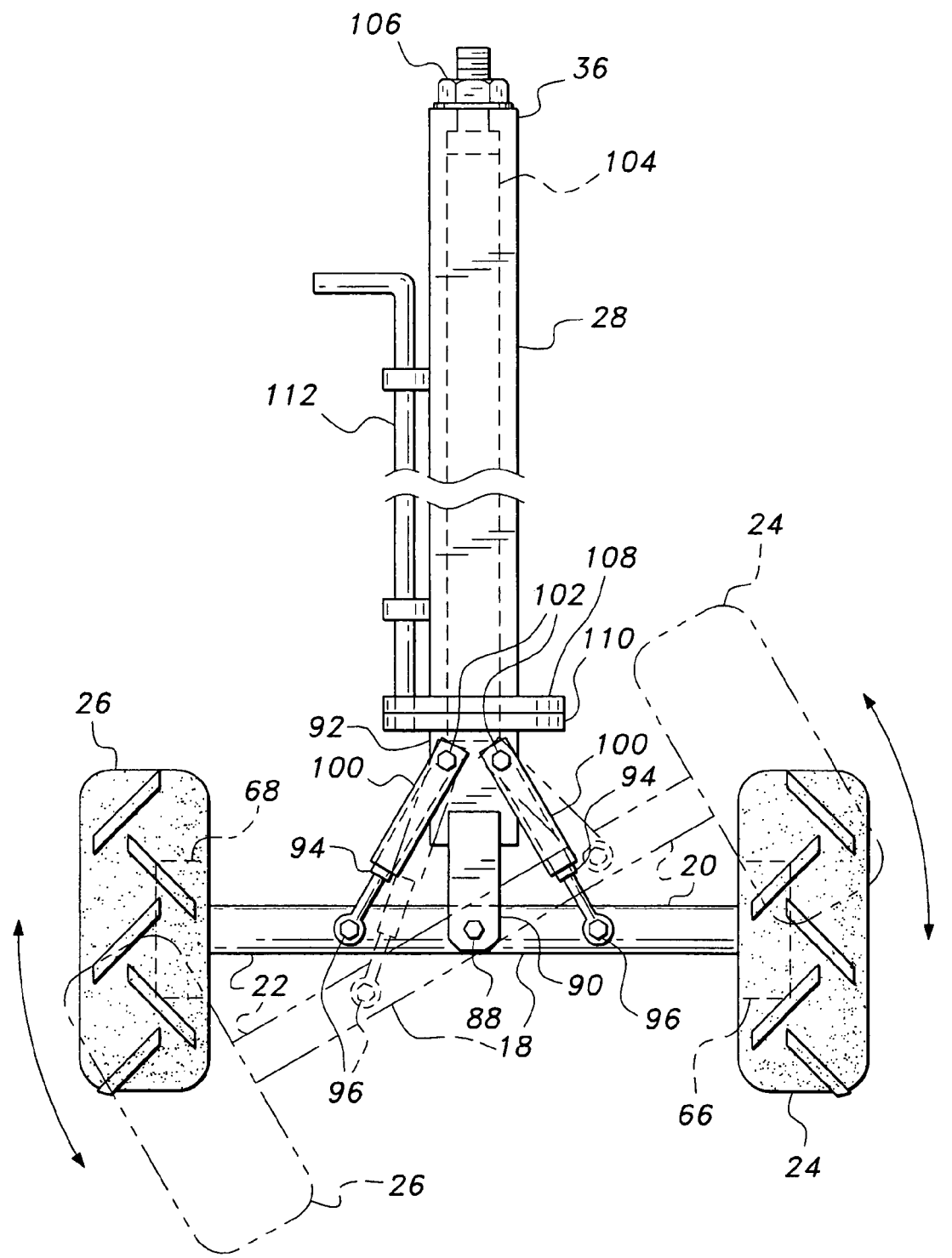
FIG. 4 is a front elevation view of the lift mechanism support column and drive axle of a powered hand truck according to the present invention, showing the drive axle suspension system.
Figure 5:
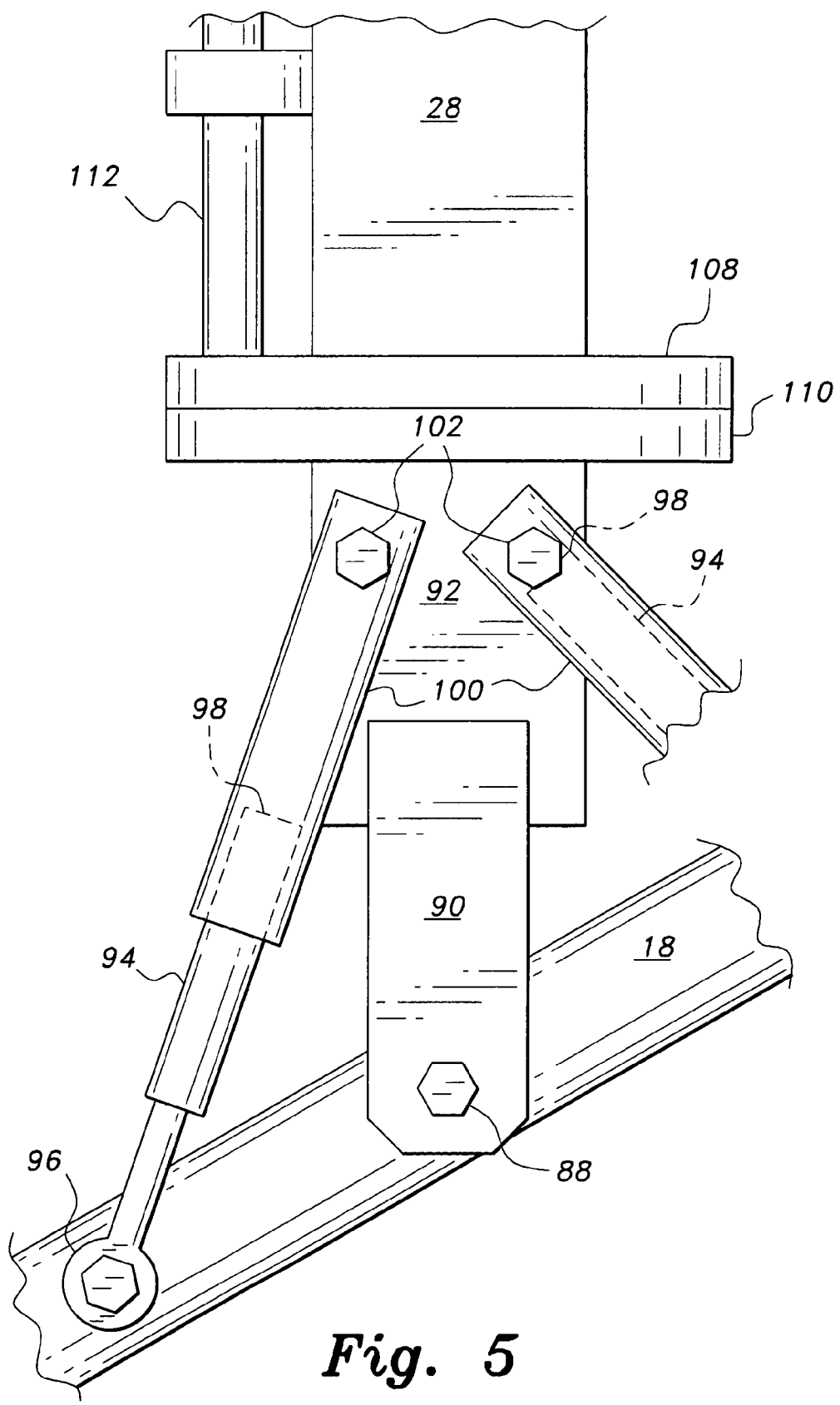
FIG. 5 is a detail view of the drive axle suspension system of FIG. 4, showing further details thereof.

The axle 18 to which the drive wheels 24, 26 and their respective drive motors 66, 68 are attached is pivotally secured to the chassis 12 in order to compensate for any uneven terrain over which the machine 10 is operated, while allowing the fork tines 44 to remain level with any load being supported. FIGS. 4 and 5 illustrate the articulation of the axle 18. A longitudinally disposed axle pivot bolt 88 extends through the center of the axle 18, pivotally securing the axle to an axle attachment bracket assembly 90, which, in turn, extends from the base 92 of the forklift support column 28. The forklift support column base 92, in turn, extends upwardly from the support axle end 14 of the chassis 12, as may be seen in FIG. 9 of the drawings.

Pivotal motion of the axle 18 is damped by first and second damper assemblies disposed to each side of the central axle pivot bolt 88. Each damper assembly comprises a pressurized element 94 (e.g., gas pressurized strut, with or without fluid damping, mechanical spring, etc.), having a lower end 96 pivotally connected to the axle 18. The upper ends 98 of the struts 94 are captured concentrically within respective first and second damper strut retaining tubes or sleeves 100, but the strut upper ends 98 are free to slide within the retaining tubes 100 and are not restricted in extension in their longitudinal movement within the tubes. The tubes 100, in turn, are pivotally secured to the forklift support column base 92 by first and second damper strut stop bolts 102, which define damper strut extension limits for the struts 94.

The lengths of the pressurized struts 94, and their attachment points to the axle 18 and the locations of the damper strut stop bolts 102, are selected to result in the upper ends 98 of the two struts 94 just contacting their respective stop bolts 102 when the axle 18 is horizontal, i.e., normal to the axis of the forklift support column 28. This results in the two struts 94 urging the axle 18 to a horizontal orientation, normal to the forklift support column 28, when pressures upon the two struts are equal. However, when the axle 18 is tilted relative to the remainder of the machine 10, as shown in broken lines in FIG. 4 and in the detail in FIG. 5, the upper end 98 of the strut 94 of the lower side of the axle pulls away from contact with its respective stop bolt 102, with the opposite strut applying greater pressure to its stop bolt. This urges the axle 18 back toward a horizontal orientation normal to the forklift support column 28, or conversely tends to align the machine with the orientation of the axle 18. The geometry of this arrangement, with the two strut free ends 98 just contacting their respective stop bolts 102 when the axle 18 is in its neutral position, results in an automatic centering reaction, which would not be the case if both struts were to apply pressure between the axle 18 and forklift support column base 92 when the axle was tilted relative to the support column 28 and remainder of the structure.

Figure 6:
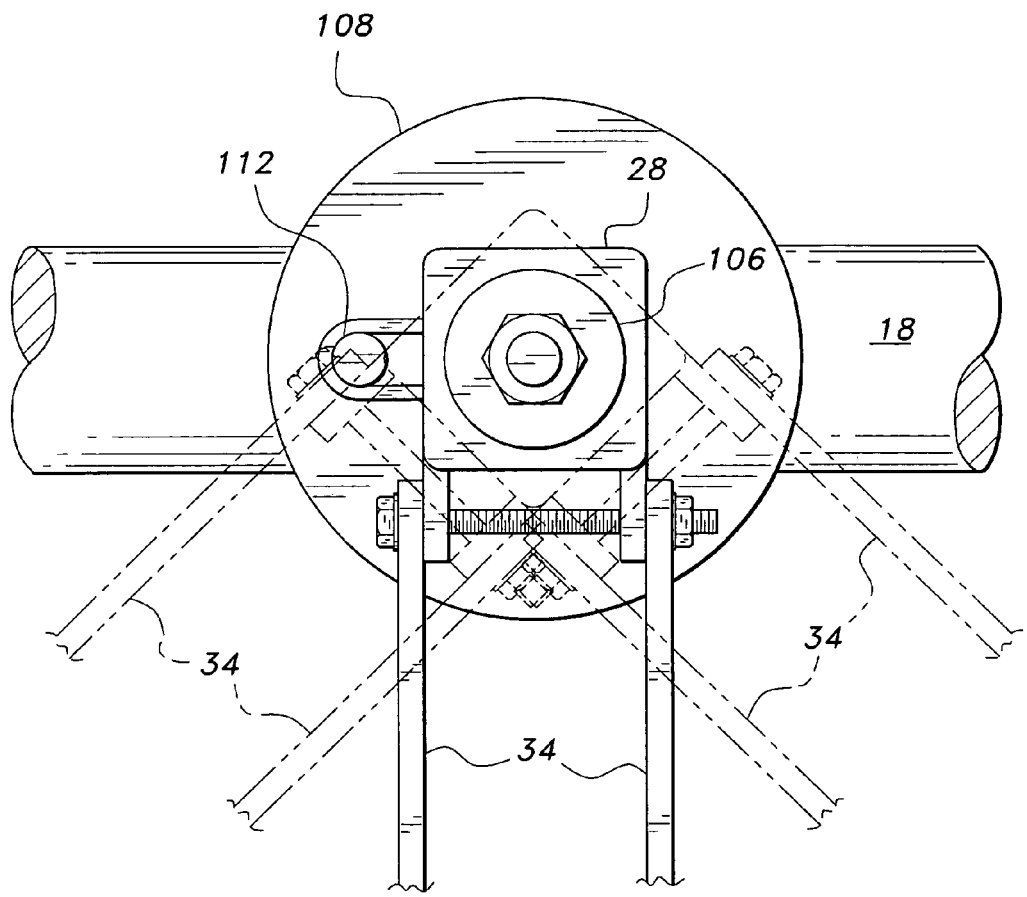
FIG. 6 is a detailed top plan view of the lift mechanism support column of FIG. 4, showing the pivotal attachment of the hydraulic lift mechanism thereon.

FIGS. 4 and 5, along with FIG. 6, also illustrate the pivotal attachment of the forklift support column 28 to its base 92 in the first embodiment of the machine. The column 28 includes a relatively stationary, i.e., non-rotating, core 104, which passes concentrically through the outer column 28. The column 28 is captured upon the core 104 by a retaining nut and washer assembly 106, or other suitable means, installed atop the core 104. The column 28 includes a relatively wide base flange 108, which rotates atop a stationary column support flange 110, which is, in turn, disposed atop the column base 92. The column support flange 110 includes a series of holes or passages therethrough, with a latch rod 112 extending downwardly along the support column 28 and through a hole or passage in the column base flange 108 to selectively engage one of the holes in the support flange 110. Thus, the operator of the machine 10 may adjust the angle of the forklift mechanism 30 and its fork tines 44 about the axis of the support column 28 for maneuvering in limited areas, or for other reasons as desired. The outward movement of the forklift mast 38, and its fork tines 44, at the generally medial lift position of the forklift mechanism provides clearance from the wheels and tires of the machine when the forklift mechanism 30 is pivoted about its support column 28, or, conversely, when the machine is pivotally maneuvered about a load supported by the fork tines and forklift mechanism.

Figure 8:
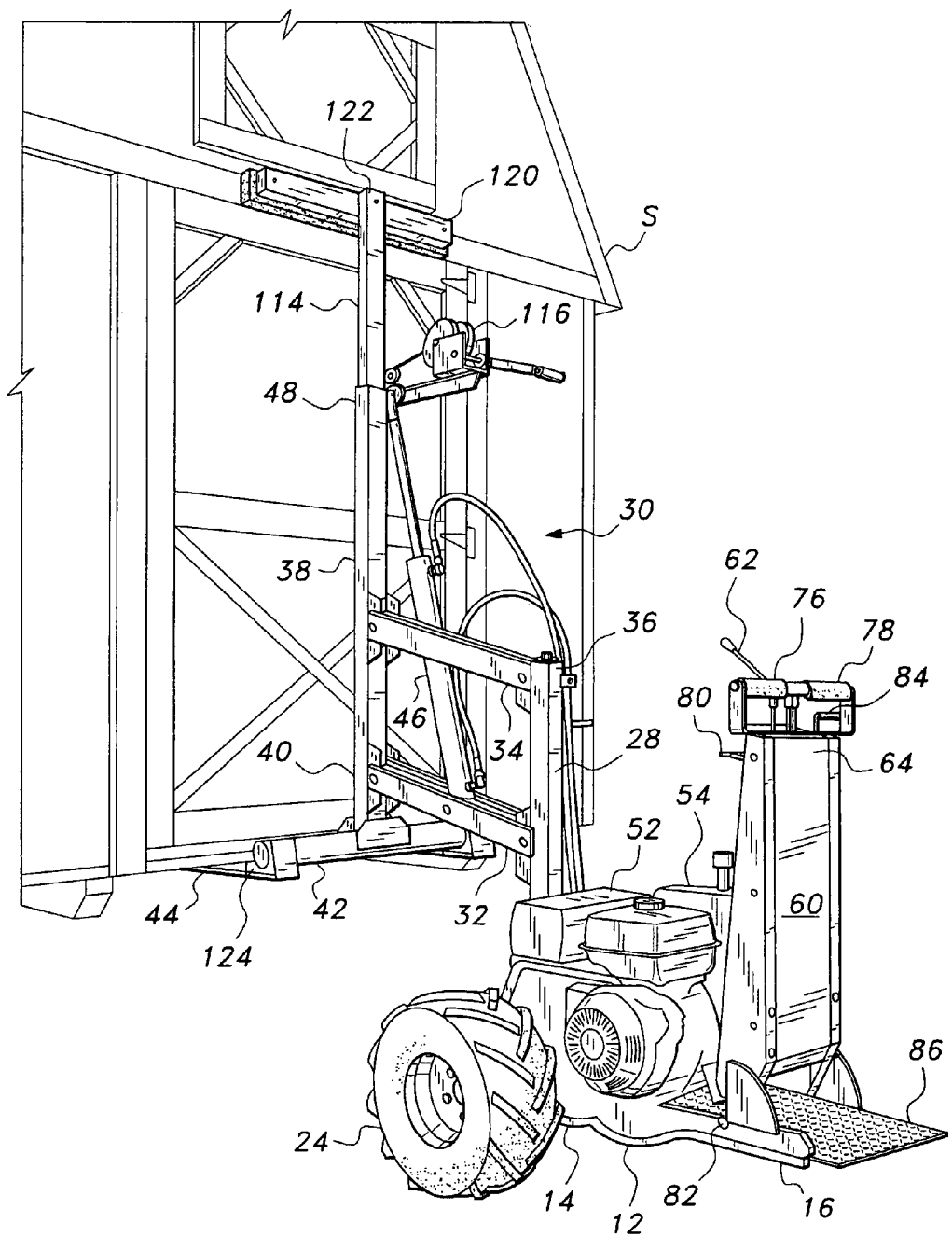
FIG. 8 is an environmental rear perspective view of the powered hand truck of FIGS. 1 through 3 in use, lifting and transporting a portable building structure.
Figure 9:
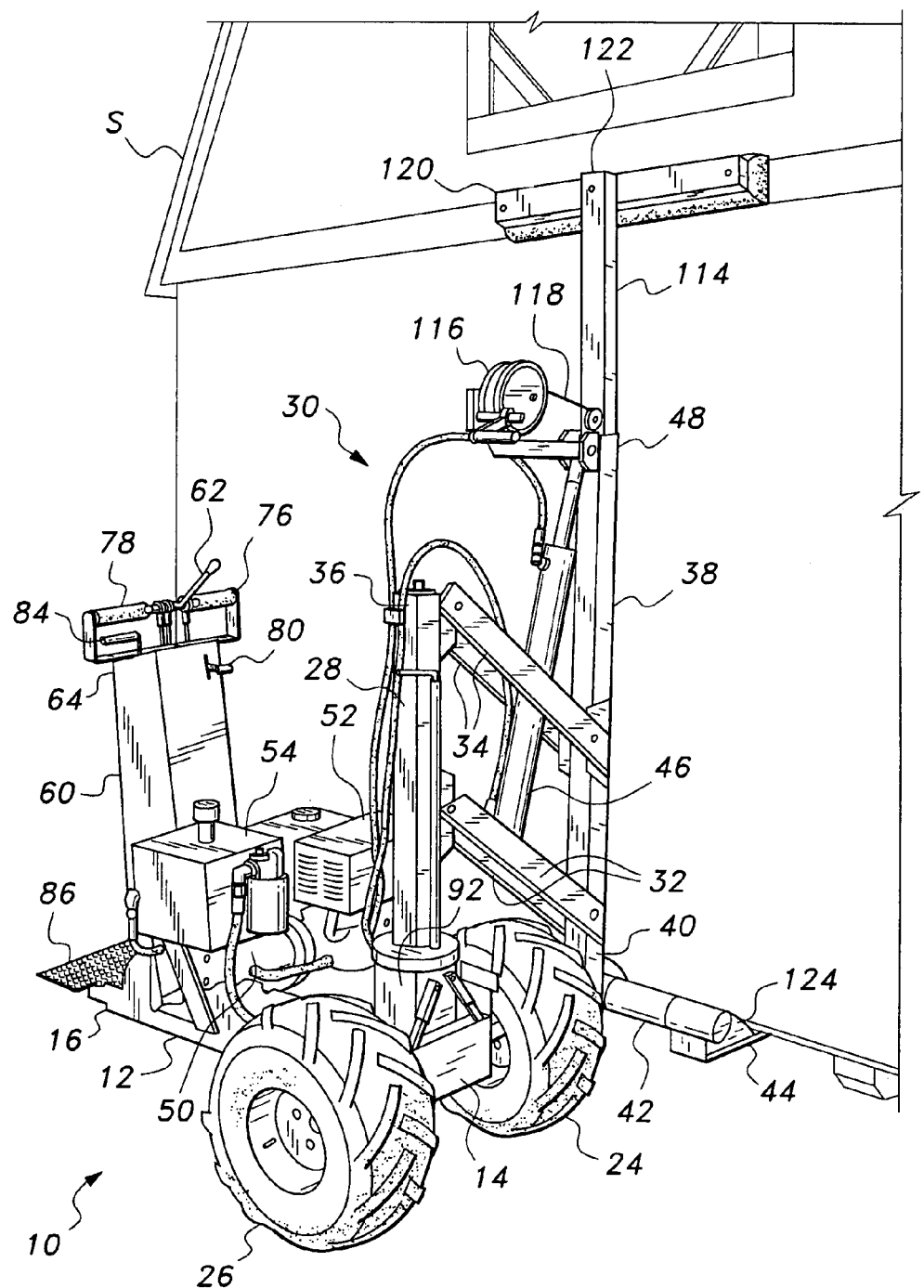
FIG. 9 is an environmental front perspective view of the powered hand truck of FIG. 8 in use, showing the lifting mechanism pivoted to the left for lifting a portable structure.

Additional versatility is provided by a telescoping forklift mast extension, which extends from the forklift mast 38, as shown in FIGS. 2, 8, and 9. The mast extension 114 telescopes concentrically within the forklift mast 38, and may be raised by means of a winch 116 disposed at the upper end 48 of the mast 38 and connected to the lower end of the extension 114 by a cable 118 which runs down the interior of the mast 38 to the base of the extension 114. The upper end of the extension 114 includes an upper end clearance standoff 120, which extends generally laterally across the upper end 122 of the forklift mast extension 114. This standoff 120, along with a lower end clearance standoff 124 disposed upon each of the fork tines 44, limits the approach of the machine 10 and its forklift mast 38 to the face of a structure. The clearance standoffs 120 and 124 contact the face of the structure at its upper portion and lower edge, thereby providing clearance between the forklift mast 38 (and its extension 114, if raised) and any protruding hardware or other components extending from the face of the structure being moved by the powered hand truck 10.

Figure 10:
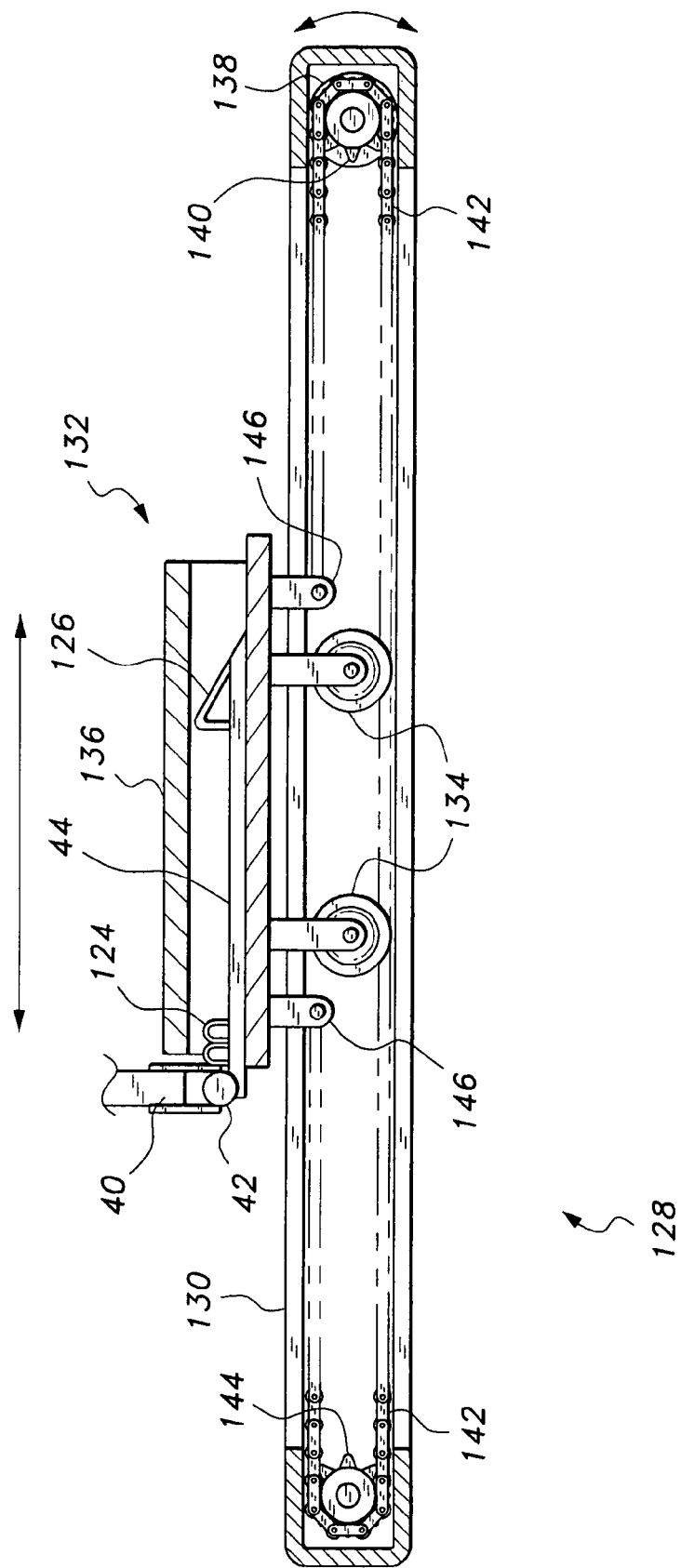
FIG. 10 is a side elevation in section of a mobile storage rack assembly for use with a powered hand truck according to the present invention.

FIGS. 8 and 9 illustrate the operation of the first embodiment powered hand truck 10 in the movement of a portable structure S, e.g., a small storage building, etc. Such portable structures S are generally constructed atop two or more skids, which raise the floor of the structure above the underlying surface. This also provides a space or gap between the floor and the underlying surface for the insertion of a lifting device, e.g., the forklift tines 44 of the present machine. Initially, one end of the structure S is raised for placement of a dolly or other suitable support therebeneath, by means of the powered hand truck 10 or other means as desired. The powered hand truck 10 is then driven to position the forklift tines 44 beneath the floor of the building or structure S opposite the end previously supported by the dolly, and advanced until the stops or clearance standoffs 120 and 124 contact the surface of the structure. The forklift mast extension 114 may be raised to position the upper standoff 120 above any relatively weaker structural components, e.g., doorways, etc., generally as shown in FIG. 9. The two tines 44 include catches 126 at their distal ends, as shown in FIGS. 1, 3, and 10, which catch beneath the edge of any doubler or sole plate beneath the floor of the portable structure S. This assures that the structure S cannot slip from the tines 44 as the machine 10 pulls the structure S across the surface. In FIG. 9, the forklift support column 28 is shown unlocked from its normal straight ahead position to allow the remainder of the machine to be pivoted relative to the structure S while the forklift mechanism 30 and fork tines 44 remain normal to the building structure. This greatly improves the maneuverability and versatility of the machine 10.

Figure 11:
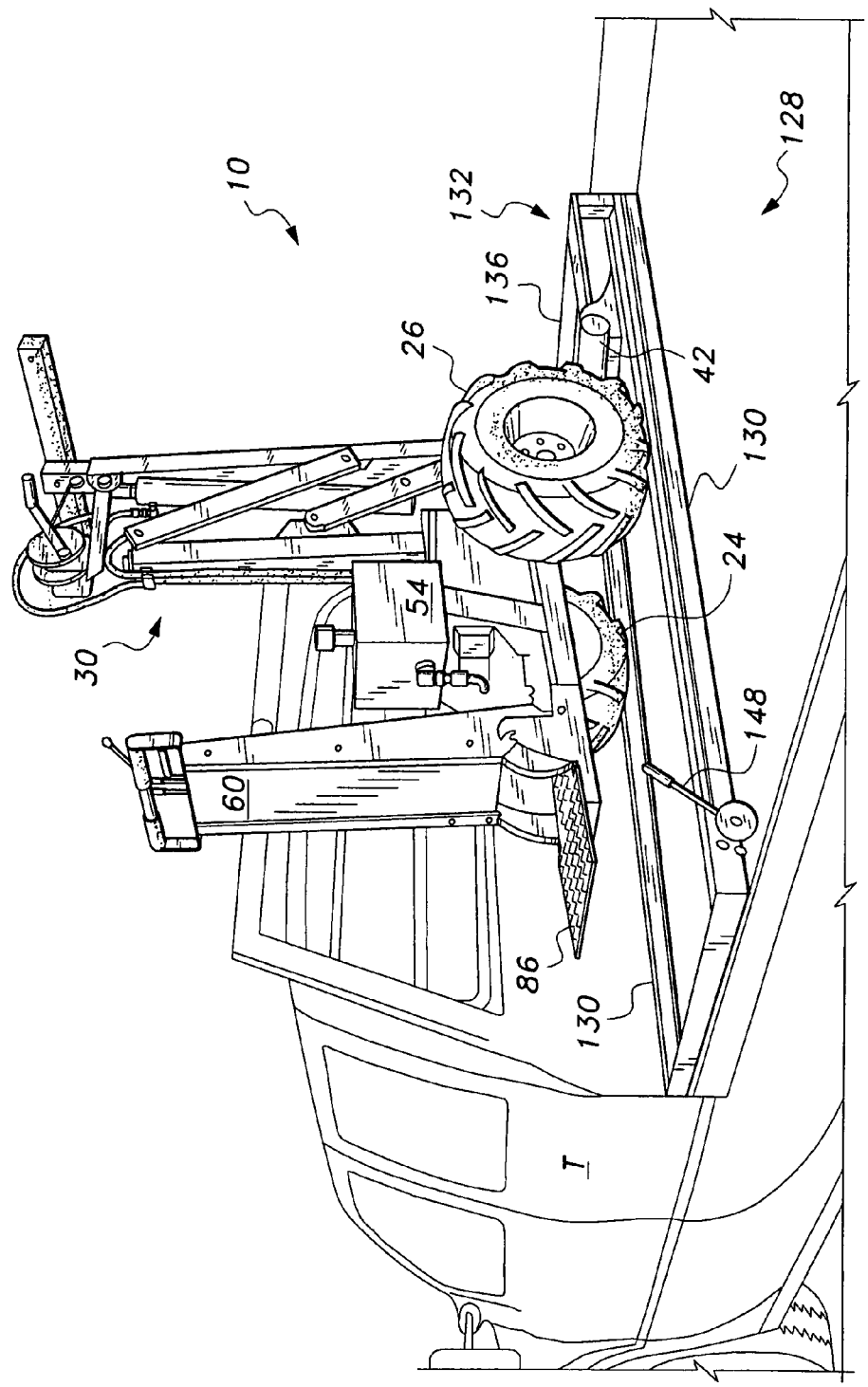
FIG. 11 is an environmental perspective view of a powered hand truck of the present invention in a stored configuration upon the mobile storage rack, which is, in turn, mounted atop the bed of a flatbed truck vehicle.
Figure 12:
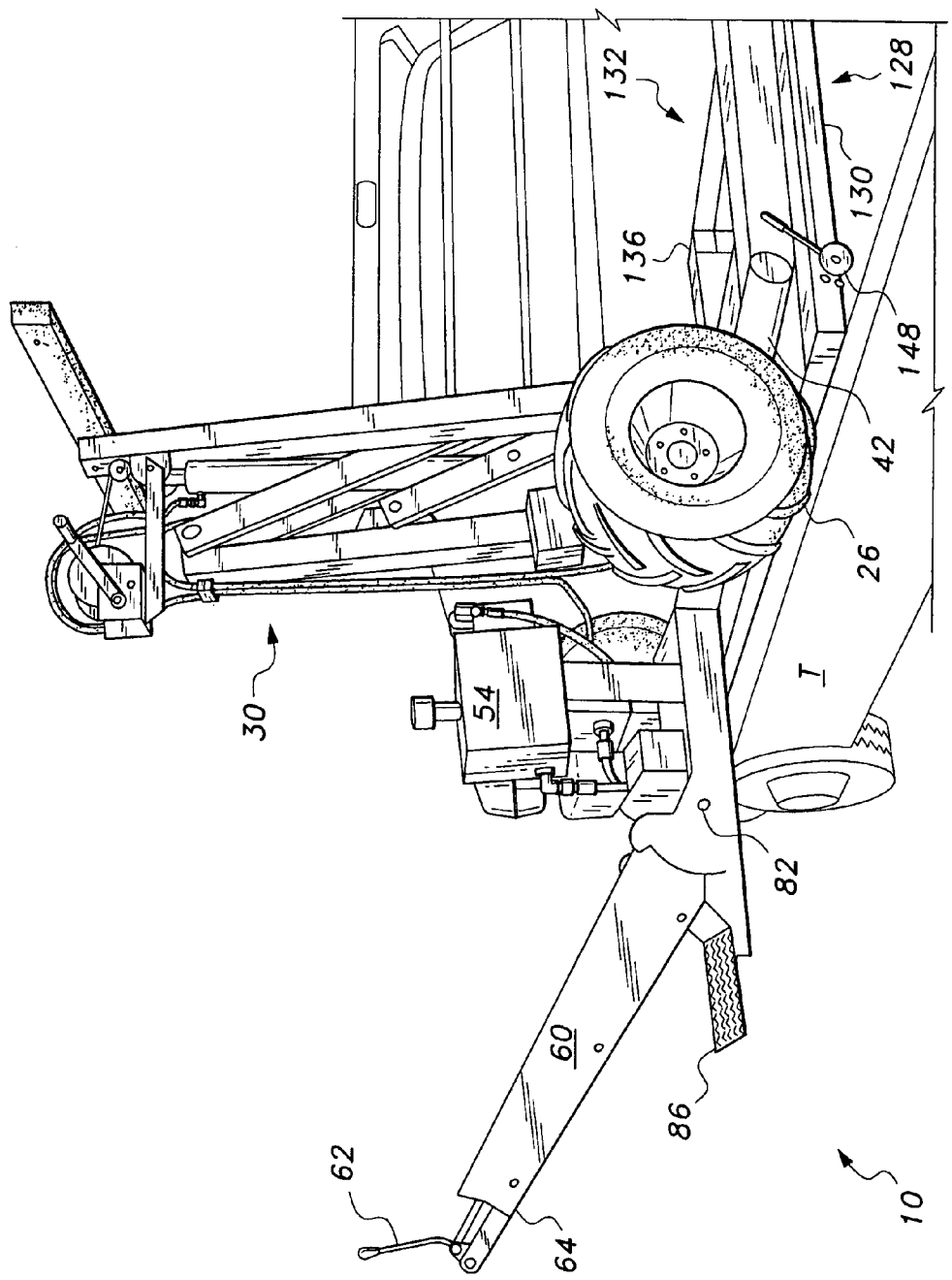
FIG. 12 is an environmental perspective view showing the initial step in removing the powered hand truck of FIG. 11 from its storage rack, or a secondary step in docking the powered hand truck with the rack.
Figure 13:
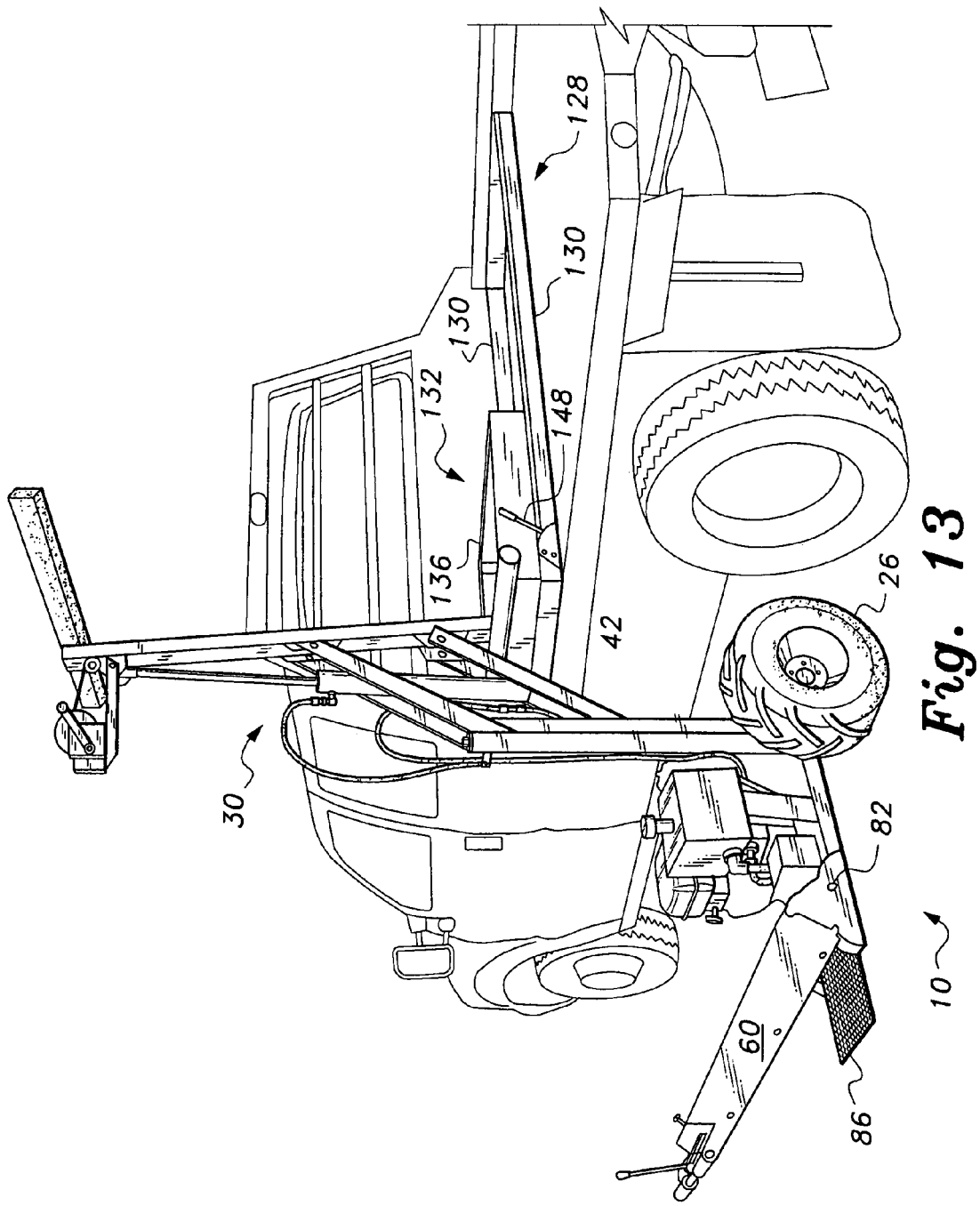
FIG. 13 is an environmental perspective view showing the final step in removing the powered hand truck of FIG. 11 from its storage rack, or the initial step in docking the powered hand truck with its rack.

FIG. 10 provides a cross-sectional view of a storage rack 128 for use in storing the powered hand truck 10, with FIGS. 11 through 13 illustrating the operation and use of the storage rack. The rack 128 has a pair of parallel, opposed tracks 130, each comprising a generally rectangular, C-shaped cross section with the open sides facing one another. The opposite ends of the tracks 130 are closed by similarly shaped components, forming a rectangular frame.

A forklift-engaging dolly 132 rides back and forth in the tracks 130, with the dolly having four wheels 134. Two of the wheels ride within the C-channel of the first track, with the other two wheels riding within the C-channel of the opposite second track. FIG. 10 provides an internal view of a single track 130, showing two of the wheels 134 on one side of the dolly 132 riding in that single track. The dolly wheels 134 depend from a single fork tine capture box 136, which comprises the body of the dolly 132.

Movement of the dolly may be motorized, if so desired. In the example illustrated in FIG. 10, an electric motor 138 is disposed within one channel end of the storage rack 128, with the motor selectively driving a chain sprocket 140 generally centrally disposed between the two tracks 130. A roller chain 142 runs around the motor drive chain sprocket 140 to an opposite idler sprocket 144 at the opposite end of the storage rack 128, and connects to opposite lugs 146 depending from each end of the dolly 132. The motor 138 is preferably a twelve-volt electric motor receiving power from the conventional twelve-volt electrical system of the vehicle (e.g., light flatbed truck T, as shown in FIGS. 11 through 13, or other vehicle as desired). A motor control switch 148 is preferably placed at some convenient location adjacent the dispensing and receiving end of the storage rack 128, as shown in FIGS. 11 through 13, precluding need for the operator to climb aboard the truck T and allowing the operator to closely monitor the operation while actuating the switch 148. The electrical system for the motor 138 is reversible using conventional circuitry, and preferably conventional limit switches are provided to stop the motor automatically when the dolly 132 reaches either end of the storage rack 128.

FIGS. 11 through 13 illustrate the operation of the storage rack 128 and its dolly 132 for removing the powered hand truck 10 from storage on the back of the truck T. In FIG. 11, the powered hand truck 10, storage rack 128, and dolly 132 are shown in the configuration for storing the hand truck 10 upon the storage rack 128, which is, in turn, installed upon the back of a flatbed truck T or other suitable vehicle. The fork tines 44 of the powered hand truck 10 are captured within the tine capture box 136 of the dolly 132, as shown in FIG. 10, and the dolly 132 has been translated all the way to the opposite side of the truck T from the dispensing and receiving end of the storage rack 128. The remainder of the powered hand truck 10 is lifted above the fork tines 44, in order that the wheels and tires 24 and 26 will clear the underlying tracks 130 of the storage rack 128 when placed thereon. This is accomplished by operating the hand truck 10 to initially capture the fork tines 44 within the fork tine capture box 136, and then actuating the lift cylinder control lever 62 to lower the fork tines 44 relative to the rest of the hand truck 10. With the fork tines 44 captured within the box 136, this has the effect of lifting the entire powered hand truck 10 relative to the tines 44 to a point above the tines 44. This allows the dolly 132 to be translated along the tracks 130 without having any of the structure of the powered hand truck 10 interfering with the storage rack 128.

The dolly 132 has been translated to the dispensing and receiving end of the storage rack 128 in the intermediate unloading step shown in FIG. 12. The powered hand truck 10 is suspended above the underlying surface, beyond the side of the truck T, due to the fork tines 44 still being captured within the capture box 136 of the dolly 132. At this point, the operator can reach up to the distal end 64 of the operator console 60 (which has been lowered about its pivot 82 in FIG. 12, for convenient access) and operate the lift cylinder control lever 62 to raise the fork tines 44 relative to the remainder of the hand truck 10. The alternative embodiment of FIGS. 14 and 15 allows the operator to stand upon the operator platform during this operation. As the tines 44 are captured within the fork tine capture box. 136, this has the effect of lowering the hand truck 10 to the surface alongside the truck T, generally as shown in FIG. 13. The powered hand truck 10 need not be running in order to accomplish this step of lowering the hand truck to the surface, as operation of the control valve will allow hydraulic pressure to bleed down from the system when the hydraulic system is not pressurized.

Once the powered hand truck 10 has been lowered to the surface, as shown in FIG. 13, it may be started and driven clear of its storage rack 128 and the truck T (or other vehicle) upon which the storage rack is mounted. The powered hand truck 10 may then be used as described further above and illustrated in FIGS. 8 and 9. When the task involving the powered hand truck 10 has been completed, it may be loaded back onto its storage rack 128 by reversing the process illustrated in FIGS. 11 through 13, with the only basic difference being that the powered hand truck 10 must be running in order to power the hydraulic system. This allows the weight of the hand truck 10 to be lifted by the fork tines 44 captured within the fork tine capture box 136 of the dolly 132. The dolly 132 is then translated along the length of the tracks 130 to position the powered hand truck 10 over the structure of the truck T, to complete the task of storing the hand truck 10.

Figure 14:
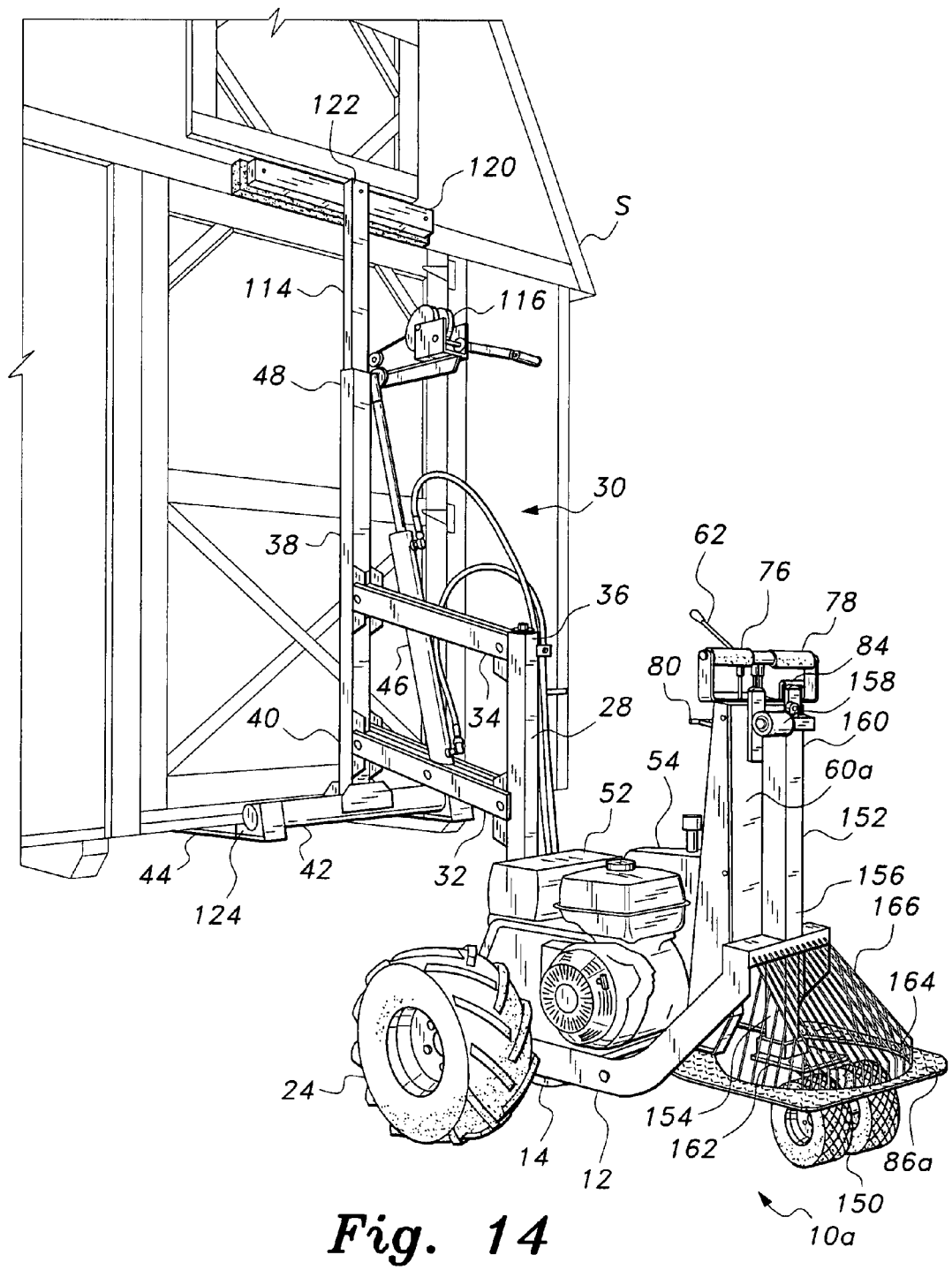
FIG. 14 is an environmental rear perspective view similar to that of FIG. 8, illustrating a second embodiment of a powered hand truck according to the present invention with additional castering wheels for support of the operator end of the machine.
Figure 15:
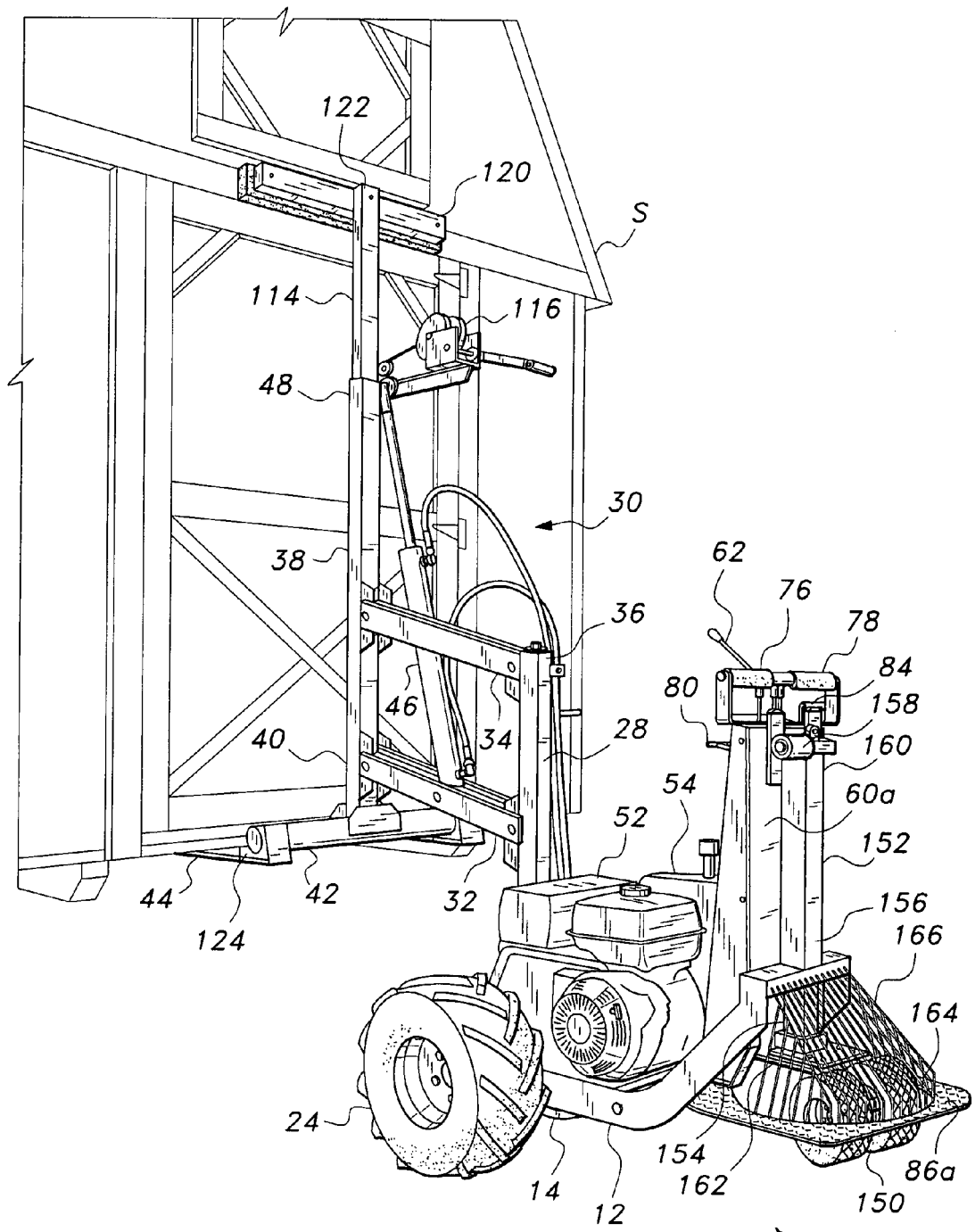
FIG. 15 is an environmental rear perspective view of the powered hand truck of FIG. 14, but showing the castering wheels in a retracted state.

FIGS. 14 and 15 illustrate another embodiment of the powered hand truck, designated as 10a in FIGS. 14 and 15. The powered hand truck 10a of FIGS. 14 and 15 is substantially similar to the powered hand truck 10 of FIGS. 1 through 9 and 11 through 13, with the primary exception of the additional castering wheel or wheels 150 installed at the operator end of the machine, along with the actuating mechanism for extending and retracting the wheel(s) 150. The caster wheel (s) 150 enable the operator to stand upon the operator platform 86a of the machine 10a when the device is not counterbalanced by the weight of a load being carried by the forklift mechanism 30, rather than having to walk behind the machine 10 when the truck 10a is being conveyed from one site to another to pick up a load.

The caster wheel or wheels 150 may be selectively retracted during load lifting and moving operations, in order to remove any support that might otherwise reduce the load and traction provided to the main or drive wheels 24 and 26. This is accomplished by a caster wheel actuation strut housing 152, installed to and extending downwardly along the operator console 60a. (The operator console 60a is fixed relative to the chassis 12 of the machine 10a, and does not articulate as does the console 60 of the first powered hand truck 10.) A caster wheel actuation strut 154 extends telescopically from the lower end 156 of the housing 152, with the strut 154 being driven extensibly and retractably from and into the housing 152 by an actuation strut drive motor 158 installed upon the operator console 60a at the upper end 160 of the housing 152. The motor 158 receives electrical power from the same source as other electrically actuated components of the hand truck 10a, and may be operated by a conventional double toggle switch (not shown) to reverse motor operation for extension and retraction of the wheel(s) 150. The drive motor 158 may turn a conventional screw jack (not shown), which engages a cooperatively threaded fitting on the actuation strut 154 within the housing 152. Other wheel extension and retraction means may be used, e.g., conventional hydraulic strut as used in other portions of the hand truck 10a, etc.

A caster wheel attachment bracket or fitting 162 extends from the lower end of the actuation strut 154, with the caster wheel(s) 150 being pivotally secured to the attachment 162 and axially offset from the axis of the actuation strut 154 in order to allow the wheel(s) to caster freely. Clearance for the wheel(s) 150 is provided by a caster wheel clearance opening 164 through the operator platform 86a. A guard 166 (rigid wire or rod, expanded or solid sheet metal, etc.) is installed about the wheel clearance opening 164 of the operator platform 86a, in order to prevent the operator from inadvertently stepping into the opening 164.

The powered hand truck 10a of FIGS. 14 and 15 permits the operator to stand atop the platform 86a and operate the machine while riding atop the platform when there is no load on the forklift mechanism 30, as the wheel(s) 150 may be extended as shown in FIG. 14 to support the weight of the operator at that end of the machine. When the powered hand truck 10a is positioned to lift a load (e.g., portable building structure S, as shown in FIGS. 14 and 15), the caster wheel(s) 150 are retracted to the general position shown in FIG. 15 in order for the wheels 150 to remain clear of the underlying surface. This assures that all of the weight of the powered hand truck 10a, along with the weight of the operator and a substantial portion of the weight of the structure S, is applied directly to the two main drive wheels 24 and 26 for optimum traction. The operator may continue to stand atop the platform 86a during the transport operation, as the weight of the structure S on the forklift mechanism 30 overbalances the weight of the operator on the platform 86a, as in the operation of the powered hand truck 10.

In conclusion, the powered hand truck and its storage rack serve to greatly facilitate the movement of relatively large and bulky objects over relatively short distances. The hand truck is particularly well suited for use in moving small, portable skid mounted buildings (e.g., storage and garden sheds, etc.), with the smaller structures needing no additional support other than the lifting of one end of the structure using the forklift mechanism of the hand truck. In the case of larger structures, one end of the structure may be lifted initially for placement of a dolly or the like therebeneath, with the powered hand truck then lifting the opposite end of the structure to move the structure as desired. The powered hand truck and its storage rack will be greatly appreciated by farmers and ranchers, contractors and others employed in the building trades, manufacturers of portable buildings and structures, etc. The powered hand truck and its storage rack will also find great utility in the field of automotive wrecking and recycling yards as well. Accordingly, the powered hand truck and the portability provided by its storage rack will be greatly appreciated by those employed in and involved with innumerable professions and activities.

It is to be understood that the present invention is not limited to the embodiments described above, but encompasses any and all embodiments within the scope of the following claims.

We claim:

1. A system comprising in combination a powered hand truck and storage rack for use therewith, the system comprising:
   a motorized hand truck, having;
      a chassis having an axle end and an operator end cantilevered opposite the axle end;
      a single axle extending laterally across the axle end of the chassis, the axle having a first end and a second end opposite the first end;
      first and second drive wheels disposed upon the first end and second end, respectively, of the axle;
      a forklift support column extending upwardly from the axle end of the chassis, the forklift support column having an upper end and a base;
      a forklift mechanism extending from the forklift support column, the forklift mechanism having:
         upper forklift actuating arms pivotally extending from the upper end of the forklift support column, the upper arms having distal ends;
         lower forklift actuating arms pivotally extending from the forklift support column parallel to the upper forklift actuating arms, the lower arms having distal ends;
         a forklift mast pivotally secured to the distal ends of the upper and lower forklift actuating arms, the forklift mast extending parallel to the forklift support column, the forklift mast having an upper end and a lower end;
         a fork attachment arm disposed laterally across the lower end of the forklift mast;
         a pair of fork tines extending from the fork attachment arm; and
         a forklift-actuating cylinder extending between the lower forklift actuating arms to the upper end of the forklift mast;
      a prime mover disposed generally medially upon the chassis, the prime mover selectively powering the drive wheels and forklift mechanism;
      an operator console extending from the operator end of the chassis;
   a motorized hand truck storage rack having:
      parallel, first and second tracks; and
      a forklift-engaging dolly disposed upon the tracks, selectively translating therealong and selectively engaging the fork tines of the motorized hand truck for storage of the motorized hand truck upon the storage rack.

2. The powered hand truck and storage rack combination according to claim 1, further including:
   an axle attachment bracket assembly depending from the base of the forklift support column of the motorized hand truck;
   a longitudinally disposed axle pivot bolt extending medially through the axle and axle attachment bracket assembly, the pivot bolt pivotally securing the axle to the base of the forklift support column and defining a longitudinal pivot axis for the axle;

a first and a second axle motion damper strut pivotally extending from the axle on opposite sides of the axle pivot bolt;

a first and a second damper strut stop bolt secured to the base of the forklift support column; and a first and a second damper strut retaining tube pivotally extending from the first and second damper strut stop bolts, respectively, the tubes being concentrically disposed about the first and second axle motion damper struts, respectively, each of the damper strut stop bolts defining a damper strut extension limit.

3. The powered hand truck and storage rack combination according to claim 1, further including a laterally disposed operator console attachment bolt pivotally connecting the operator console to the operator end of the chassis for selective articulation of the operator console relative to the chassis.

4. The powered hand truck and storage rack combination according to claim 1, further including:

a hydraulic pump disposed upon the motorized hand truck, the pump being driven by the prime mover; and a first and a second hydraulic motor disposed at the first and second drive wheels, respectively, the motors selectively communicating with the hydraulic pump.

5. The powered hand truck and storage rack combination according to claim 1, wherein the forklift support column is pivotally mounted upon the chassis.

6. The powered hand truck and storage rack combination according to claim 1, further including:

a forklift mast extension telescopically disposed within the forklift mast of the motorized hand truck; and a forklift mast extension winch disposed at the upper end of the forklift mast, the extension being connected to the forklift mast extension.

7. The powered hand truck and storage rack combination according to claim 1, further including:

a caster wheel actuation strut housing extending downwardly along the operator console, the housing having an upper end and a lower end opposite the upper end;

a caster wheel actuation strut extending telescopically from the lower end of the housing, the strut having a caster wheel attachment;

an actuation strut drive motor disposed atop the housing, the motor selectively extending and retracting the strut relative to the housing;

at least one caster wheel extending from the caster wheel attachment of the strut; and an operator platform extending from the operator end of the chassis, the operator platform having a caster wheel clearance opening therein.

8. The powered hand truck and storage rack combination according to claim 1, further including a motor and chain drive assembly disposed within the tracks of the storage rack, the assembly communicating with the forklift engaging dolly and selectively driving the dolly along the tracks.

* * * * *